US009148331B2

(12) United States Patent
Lord et al.

(10) Patent No.: US 9,148,331 B2
(45) Date of Patent: Sep. 29, 2015

(54) CONTROL OF TRANSMISSION TO A TARGET DEVICE WITH A CLOUD-BASED ARCHITECTURE

(71) Applicant: Elwha LLC, Bellevue, WA (US)

(72) Inventors: Richard T. Lord, Tacoma, WA (US);
Robert W. Lord, Seattle, WA (US);
Craig J. Mundie, Seattle, WA (US);
Clarence T. Tegreene, Mercer Island, WA (US)

(73) Assignee: Elwha LLC, Bellevue, WA (US)

( * ) Notice: Subject to any disclaimer, the term of this patent is extended or adjusted under 35 U.S.C. 154(b) by 225 days.

(21) Appl. No.: 13/707,261

(22) Filed: Dec. 6, 2012

(65) Prior Publication Data

US 2013/0297793 A1    Nov. 7, 2013

Related U.S. Application Data

(63) Continuation-in-part of application No. 13/678,082, filed on Nov. 15, 2012, and a continuation-in-part of application No. 13/678,010, filed on Nov. 15, 2012, and a continuation-in-part of application No. 13/462,283, filed on May 2, 2012, now abandoned.

(51) Int. Cl.
| | |
|---|---|
| *H04L 12/911* | (2013.01) |
| *H04L 29/08* | (2006.01) |
| *H04W 4/00* | (2009.01) |
| *H04W 4/02* | (2009.01) |

(52) U.S. Cl.
CPC ...... *H04L 29/08081* (2013.01); *H04L 67/1002* (2013.01); *H04W 4/003* (2013.01); *H04W 4/02* (2013.01)

(58) Field of Classification Search
CPC ..................................................... H04L 47/822
USPC .......................... 709/203, 206, 217, 223, 224
See application file for complete search history.

(56) References Cited

U.S. PATENT DOCUMENTS

| 6,377,565 B1 | 4/2002 | Puckette, IV |
| 6,832,243 B1 | 12/2004 | Mikalsen et al. |
| 7,460,874 B1 | 12/2008 | Hou et al. |

(Continued)

FOREIGN PATENT DOCUMENTS

WO    WO 2012/135557 A1    10/2012

OTHER PUBLICATIONS

PCT International Search Report; International App. No. PCT/US 13/70319; May 12, 2014; pp. 1-2.

(Continued)

*Primary Examiner* — Lashonda Jacobs
(74) *Attorney, Agent, or Firm* — Suiter Swantz pc llo

(57) ABSTRACT

Systems, methods, computer-readable storage mediums including computer-readable instructions and/or circuitry for control of transmission to a target device with a cloud-based architecture may implement operations including, but not limited to: receiving localized context information associated with the at least one target device; determining, at least in part via a cloud-based architecture, at least one prospective message transmission practicability index according to a comparison of localized context information and the at least one historical transmission length; and authorizing, at least in part via a cloud-based architecture, at least one transmission to a target device in response to a determination of a prospective message transmission practicability index.

39 Claims, 11 Drawing Sheets

(56) References Cited

U.S. PATENT DOCUMENTS

| | | |
|---|---|---|
| 7,707,276 B2 | 4/2010 | Brenes et al. |
| 8,281,027 B2 | 10/2012 | Martinez et al. |
| 2002/0004840 A1 | 1/2002 | Harumoto et al. |
| 2002/0029285 A1* | 3/2002 | Collins ............... 709/232 |
| 2005/0085240 A1 | 4/2005 | Fitzgerald |
| 2005/0219213 A1* | 10/2005 | Cho et al. ............. 345/158 |
| 2006/0133428 A1 | 6/2006 | Guthrie et al. |
| 2006/0236401 A1 | 10/2006 | Fosdick |
| 2007/0055733 A1 | 3/2007 | Maruyama |
| 2007/0112970 A1 | 5/2007 | Kihara et al. |
| 2007/0155441 A1 | 7/2007 | Carbonaro |
| 2008/0046922 A1 | 2/2008 | Jankins et al. |
| 2008/0225890 A1 | 9/2008 | Howard |
| 2009/0129323 A1* | 5/2009 | Chen et al. ............ 370/329 |
| 2010/0034177 A1* | 2/2010 | Santhanam ............ 370/338 |
| 2010/0085948 A1 | 4/2010 | Yu et al. |
| 2010/0248768 A1 | 9/2010 | Nakatsugawa |
| 2010/0253801 A1* | 10/2010 | Konishi ............... 348/222.1 |
| 2011/0070898 A1 | 3/2011 | Sanjeev et al. |
| 2011/0167474 A1 | 7/2011 | Sinha et al. |
| 2012/0060041 A1 | 3/2012 | Hashimoto |
| 2012/0131184 A1 | 5/2012 | Luna et al. |
| 2012/0185419 A1 | 7/2012 | Kuhn et al. |
| 2012/0233656 A1 | 9/2012 | Rieschick et al. |
| 2012/0324106 A1* | 12/2012 | Chang et al. ............ 709/224 |
| 2013/0018608 A1* | 1/2013 | Houston et al. ........... 702/61 |
| 2013/0205390 A1 | 8/2013 | Hauck et al. |
| 2013/0212185 A1* | 8/2013 | Pasquero et al. ........ 709/206 |
| 2013/0298183 A1 | 11/2013 | McGrath et al. |
| 2014/0007175 A1 | 1/2014 | Cho et al. |

OTHER PUBLICATIONS

Excerpt from the USPTO Scientific and Technical Information Center (STIC); created on Jul. 11, 2014; pp. 1-3 (as provided by examiner).

* cited by examiner

300

302 receiving localized context information associated with the at least one target device 402 receiving localized context information associated with the at least one target device in response to an enqueuing of a transmission 404 receiving localized context information associated with the at least one target device in response to an enqueuing of a threshold number of transmissions 304 associating, at least in part via a cloud-based architecture, at least one historical transmission length for at least one transmission to at least one target device with historical localized context information associated with the at least one target device 306 determining, at least in part via a cloud-based architecture, at least one prospective message transmission practicability index according to a comparison of localized context information and the at least one historical transmission length 308 authorizing, at least in part via a cloud-based architecture, at least one transmission to a target device in response to a determination of a prospective message transmission practicability index

302 receiving localized context information associated with the at least one target device

| 502 receiving a at least one geographical identifier associated with the at least one target device | 504 receiving at least one power indicator associated with the at least one target device | 506 receiving one or more inertial signals associated with the at least one target device |

304 associating, at least in part via a cloud-based architecture, at least one historical transmission length for at least one transmission to at least one target device with historical localized context information associated with the at least one target device 306 determining, at least in part via a cloud-based architecture, at least one prospective message transmission practicability index according to a comparison of localized context information and the at least one historical transmission length 308 authorizing, at least in part via a cloud-based architecture, at least one transmission to a target device in response to a determination of a prospective message transmission practicability index

FIG. 5

302 receiving localized context information associated with the at least one target device 304 associating, at least in part via a cloud-based architecture, at least one historical transmission length for at least one transmission to at least one target device with historical localized context information associated with the at least one target device

| 802 associating, at least in part via a cloud architecture, the at least one historical transmission length with at least one historical geographical identifier associated with the at least one target device | 804 associating, at least in part via a cloud architecture, the at least one historical transmission length with at least one historical power indicator associated with the at least one target device | 806 associating, at least in part via a cloud architecture, the at least one historical transmission length with at least one historical inertial signal associated with the at least one target device |

306 determining, at least in part via a cloud-based architecture, at least one prospective message transmission practicability index according to a comparison of localized context information and the at least one historical transmission length 308 authorizing, at least in part via a cloud-based architecture, at least one transmission to a target device in response to a determination of a prospective message transmission practicability index

┌─────────────────────────────────────────────────────────────────────────┐
│ 302 receiving localized context information associated with the at least one │
│ target device                                                           │
└─────────────────────────────────────────────────────────────────────────┘
                                     │
┌─────────────────────────────────────────────────────────────────────────┐
│ 304 associating, at least in part via a cloud-based architecture, at least one │
│ historical transmission length for at least one transmission to at least one  │
│ target device with historical localized context information associated with   │
│ the at least one target device                                          │
│  ┌──────────────────┐  ┌──────────────────┐  ┌──────────────────┐       │
│  │ 1002 associating,│  │ 1004 associating,│  │ 1006 associating,│       │
│  │ at least in part │  │ at least in part │  │ at least in part │       │
│  │ via a cloud      │  │ via a cloud      │  │ via a cloud      │       │
│  │ architecture,    │  │ architecture,    │  │ architecture,    │       │
│  │ the at least one │  │ the at least one │  │ the at least one │       │
│  │ historical       │  │ historical       │  │ historical       │       │
│  │ transmission     │  │ transmission     │  │ transmission     │       │
│  │ length with at   │  │ length with at   │  │ length with at   │       │
│  │ least one        │  │ least one        │  │ least one        │       │
│  │ historical signal│  │ historical       │  │ historical       │       │
│  │ strength         │  │ bandwidth        │  │ connection type  │       │
│  │ associated with  │  │ associated with  │  │ associated with  │       │
│  │ the at least one │  │ the at least one │  │ the at least one │       │
│  │ target device    │  │ target device    │  │ target device    │       │
│  └──────────────────┘  └──────────────────┘  └──────────────────┘       │
└─────────────────────────────────────────────────────────────────────────┘
                                     │
┌─────────────────────────────────────────────────────────────────────────┐
│ 306 determining, at least in part via a cloud-based architecture, at least one │
│ prospective message transmission practicability index according to a    │
│ comparison of localized context information and the at least one historical │
│ transmission length                                                     │
└─────────────────────────────────────────────────────────────────────────┘
                                     │
┌─────────────────────────────────────────────────────────────────────────┐
│ 308 authorizing, at least in part via a cloud-based architecture, at least one │
│ transmission to a target device in response to a determination of a     │
│ prospective message transmission practicability index                   │
└─────────────────────────────────────────────────────────────────────────┘
```

FIG. 10

CONTROL OF TRANSMISSION TO A TARGET DEVICE WITH A CLOUD-BASED ARCHITECTURE

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

For purposes of the USPTO extra-statutory requirements, the present application constitutes a continuation-in-part of the U.S. patent application Ser. No. 13/462,283, entitled Control of Transmission to a Target Device with a Cloud-Based Architecture, naming Robert W. Lord, Richard T. Lord, Craig J. Mundie, and Clarence T. Tegreene as inventors, filed May 2, 2012, which is currently co-pending or is an application of which a currently co-pending application is entitled to the benefit of the filing date.

For purposes of the USPTO extra-statutory requirements, the present application constitutes a continuation-in-part of the U.S. patent application Ser. No. 13/678,010, entitled Control of Transmission to a Target Device with a Cloud-Based Architecture, naming Robert W. Lord, Richard T. Lord, Craig J. Mundie, and Clarence T. Tegreene as inventors, filed Nov. 15, 2012, which is currently co-pending or is an application of which a currently co-pending application is entitled to the benefit of the filing date.

For purposes of the USPTO extra-statutory requirements, the present application constitutes a continuation-in-part of the U.S. patent application Ser. No. 13/678,082, entitled Control of Transmission to a Target Device with a Cloud-Based Architecture, naming Robert W. Lord, Richard T. Lord, Craig J. Mundie, and Clarence T. Tegreene as inventors, filed Nov. 15, 2012, which is currently co-pending or is an application of which a currently co-pending application is entitled to the benefit of the filing date.

RELATED APPLICATIONS

None

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation (s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

SUMMARY

Systems, methods, computer-readable storage mediums including computer-readable instructions and/or circuitry for control of transmission to a target device with a cloud-based architecture may implement operations including, but not limited to: receiving localized context information associated with the at least one target device; determining, at least in part via a cloud-based architecture, at least one prospective message transmission practicability index according to a comparison of localized context information and the at least one historical transmission length; and authorizing, at least in part via a cloud-based architecture, at least one transmission to a target device in response to a determination of a prospective message transmission practicability index.

The foregoing summary is illustrative only and is not intended to be in any way limiting. In addition to the illustrative aspects, embodiments, and features described above, further aspects, embodiments, and features will become apparent by reference

BRIEF DESCRIPTION OF THE FIGURES

FIGS. 3-11 show operations for control of transmission to a target device with a cloud-based architecture.

DETAILED DESCRIPTION

Figure 1:
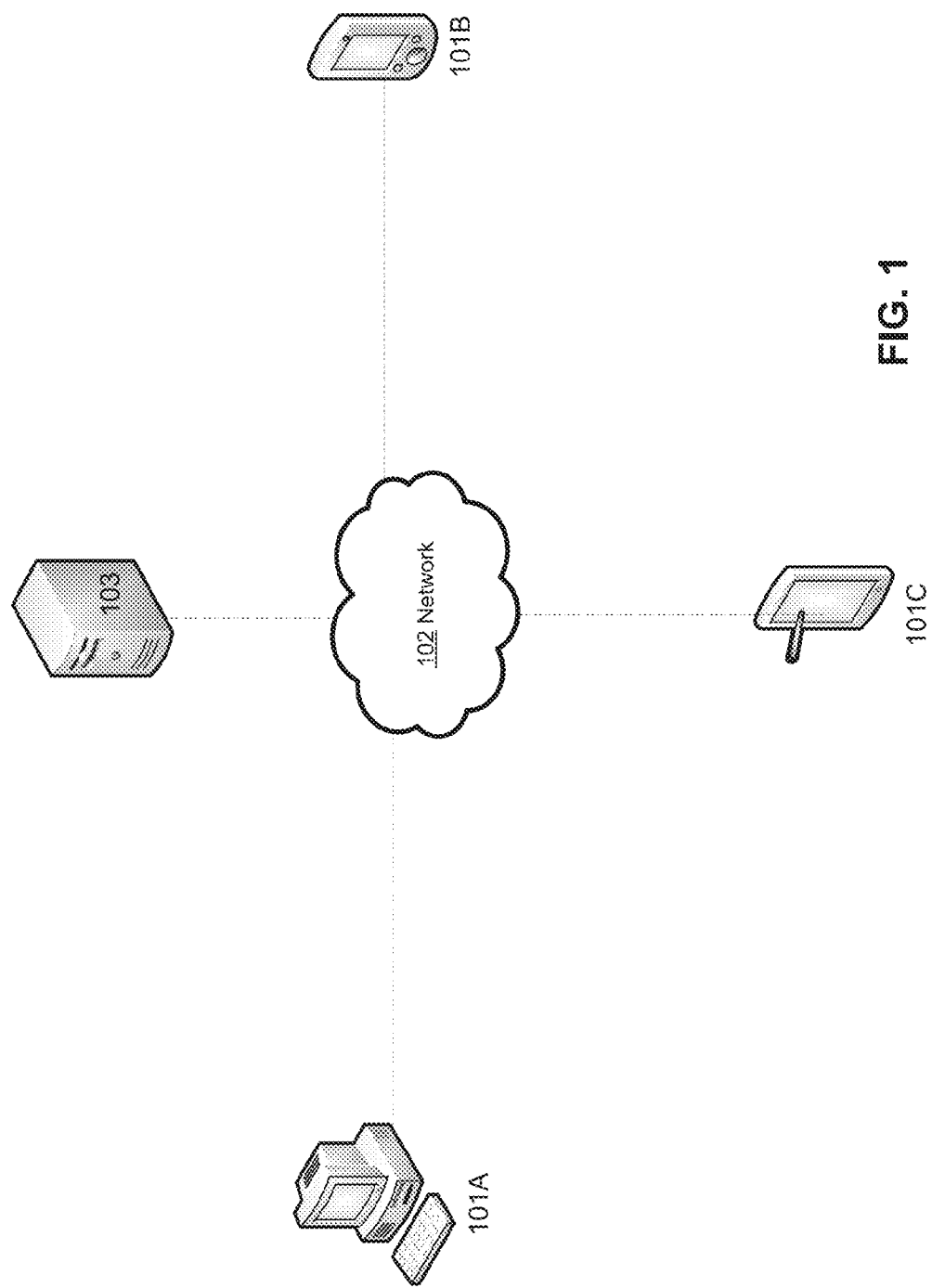
FIG. 1 shows a high-level block diagram of an operational environment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 is a block diagram of a cloud-based computing system 100 employing a cloud-based architecture. The cloud-based computing system 100 may include a variety of computing devices 101 connected via a network 102. The network 102 may be the Internet, a Local Area Network (LAN), a wireless network (such as a wireless LAN or WLAN), or other network, or a combination of networks. The cloud-based computing system 100 may further include a cloud-based server 103, operably coupled to the computing devices 101 via the network 102.

The computing devices 101 may each be any type of computer or computing device, such as a desktop computer, laptop computer, netbook, tablet computer, mobile computing device (such as a cell phone, smartphone, personal digital assistant or other mobile or handheld or wireless computing device), or any other computer/computing device. The computing devices 101 may include one or more of a user input/output devices such as a display, keyboard, and a pointing device (such as a track ball, mouse, touch pad, touch screen or other pointing device).

The computing devices 101 may include memory to store data and software/computer instructions, a processor for executing software/computer instructions and providing overall control to the computer. The computing devices 101 may each include an operating system (OS) stored in memory and executed at startup, for example.

Figure 2:
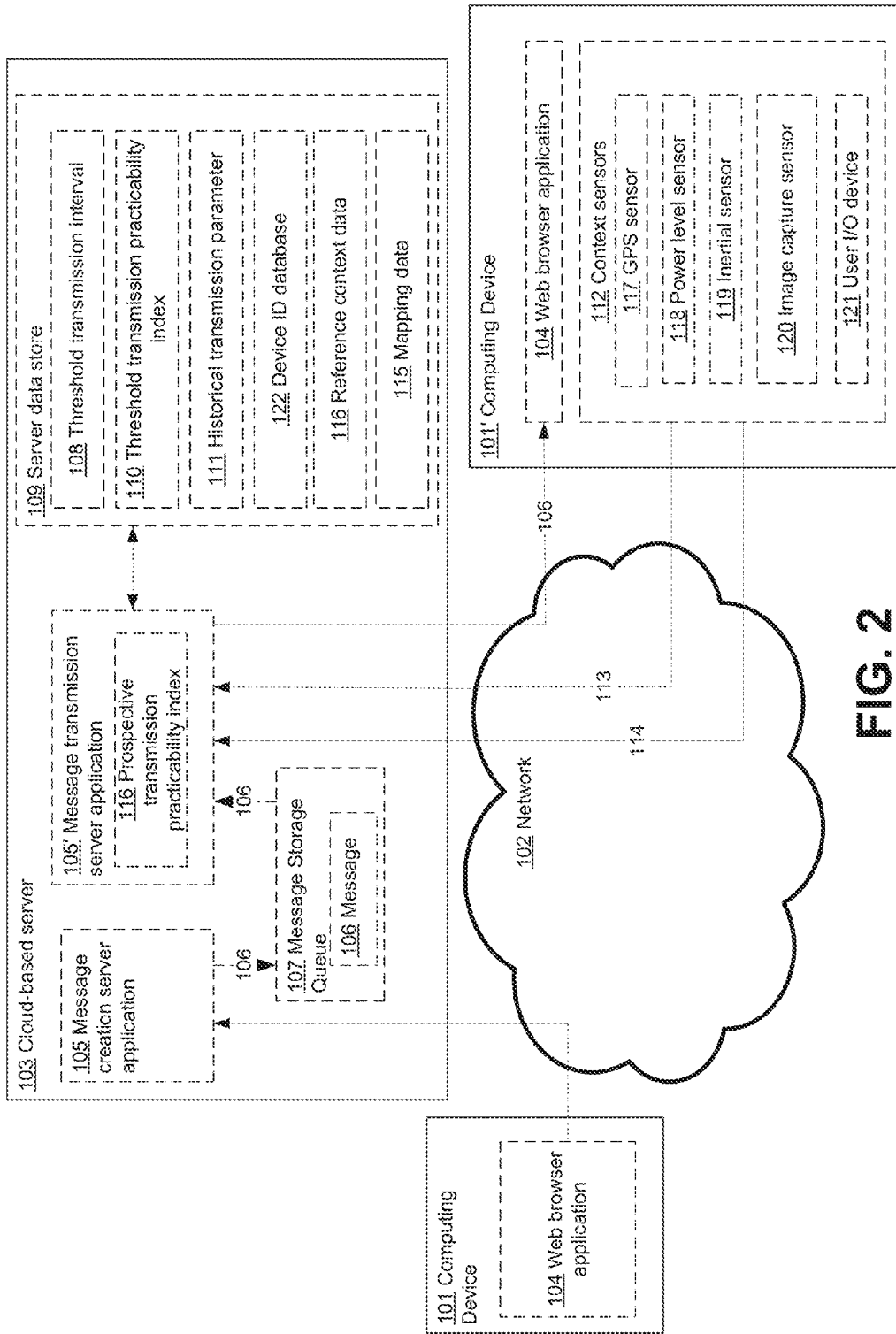
FIG. 2 shows a high-level block diagram of an operational environment.

Referring to FIG. 2, the computing devices 101 may execute or run a web browser application 104 configured to access data maintained on one or more other computing devices 101 and/or the cloud-based server 103 via the network 102.

The cloud-based server 103 (which may include a processor and memory) may run one or more applications, such as server application 105 to provide a cloud-based service (or a cloud-based computing service) where cloud-based server 103 (and/or other servers associated with the cloud-based service) may provide resources, such as software, data, media (e.g., video, audio files) and other information, and management of such resources, to computing devices 101 via the network 102.

According to an example embodiment, computing resources such as application programs and file storage may be remotely provided by the cloud-based service (e.g., by cloud-based server 103) to a computing device 101 over the network 102 through the web browser application 104 running on the computing device 101. For example, a client computing device 101 may include the web browser application 104 running applications (e.g., Java applets or other applications), which may include application programming interfaces ("API's") to more sophisticated applications (such as server application 105) running on remote servers that provide the cloud-based service (cloud-based server 103), as an example embodiment.

In an example embodiment, through the web browser application 104, a user can use a computing device 101 to log on to cloud-based services (e.g., by the web browser application 104 communicating with cloud-based server 103 of the cloud-based computing system 100) to access a server application 105. After logging-on to the server application 105, the user may create, edit, save and delete files on cloud-based server 103, and may establish (set up) or change/edit various options, such as user preferences and/or system settings, and/or may receive or download software (e.g., operating system or other software) or software updates, various data files or media files, user preferences and/or system settings, and other information previously stored on the cloud-based server 103, via the server application 105 running on the cloud-based server 103.

In an example embodiment, as shown in FIG. 2, a user of a first computing device 101 may compose a message 106 (e.g. an e-mail message, text message, instant message, or any other data transmission) for transmission to a target computing device 101 (e.g. computing device 101') via the cloud-based computing system 100. The first computing device 101 may access a message creation server application 105 running on cloud-based server 103 to compose the message 106 and the message 106 may be stored to a message storage queue 107 maintained in memory by the cloud-based server 103. The cloud-based server 103 may, in turn, employ a message transmission server application 105' to transmit one or more messages 106 stored in the message storage queue 107 to the target computing device 101'. It will be noted that the determination of when to transmit messages 106 stored in the message storage queue 107 to the target computing device 101' may carried out solely by the cloud-based server 103 architecture and not at the direction of either the transmitting computing device 101 or the target computing device 101'. Rather, the cloud-based server 103 may direct the transmission of messages 106 to the target computing device 101' according to one or more cloud-based server-defined parameters.

In an exemplary embodiment, the cloud-based server-defined parameter may be an elapsed time since a prior authorization to transmit a message 106 to a target device. For example, the message transmission server application 105' running on the cloud-based server 103 may be configured to authorize the transmission of messages 106 to the target computing device 101' only at fixed time intervals (e.g. every 15 minutes). Specifically, the message transmission server application 105' may detect an elapsed time since a prior attempted transmission of at least one message 106 and, if the elapsed time exceeds a threshold transmission interval 108 maintained by a server data store 109, the message transmission server application 105' may authorize the transmission of one or more messages 106 created by the user of the first computing device 101 (if any) during the time elapsed since a prior authorization to transmit messages 106 (e.g. a batch-type transmission of according to the server-maintained threshold transmission interval 108. The initiation of such transmissions by the message transmission server application 105' may be wholly independent of any action by the computing device 101 or the target computing device 101'.

In another exemplary embodiment, the cloud-based server-defined parameter may be a prospective transmission practicability index 116 computed by the cloud-based server 103 and associated with the practicability of successfully transmitting one or more messages 106 to a target computing device 101'. For example, the message transmission server application 105' may be configured to authorize the transmission of messages 106 to the target computing device 101' only when a prospective transmission practicability index 116 computed from localized context information associated with the target computing device 101' complies with one or more threshold metrics maintained as a threshold transmission practicability index 110 maintained by the server data store 109. Specifically, the cloud-based server 103 may receive localized context data 113 associated with the target computing device 101' including, but not limited to, at least one of a serial number of the target computing device 101', a model number of the target computing device 101', a network address of the target computing device 101', a geographical identifier of the target computing device 101', a power indicator of the target computing device 101', a bandwidth indicator of the target computing device 101', an inertial signal associated with the target computing device 101', an imaging signal associated with the target computing device 101', or a user input/output indicator associated with the target computing device 101'. The message transmission server application 105' may compare a transmission practicability index computed from the localized context information associated with the target computing device 101' to the threshold transmission practicability index 110 and, if the transmission practicability index computed from the localized context information associated with the target computing device 101' complies with the threshold transmission practicability index 110, transmit a message 106 to the target computing device 101. Otherwise, the message 106 is retained in the message storage queue 107 until the transmission practicability index computed from the localized context information associated with the target computing device 101' complies with the threshold transmission practicability index 110, if ever.

In another exemplary embodiment, the cloud-based server-defined parameter may be a historical transmission parameter 111. For example, the message transmission server application 105' of the cloud-based server 103 may be configured to authorize the transmission of messages 106 to the target computing device 101' only when various prospective message parameters (e.g. prospective transmission message lengths) correspond to historical ranges for those message parameters. Specifically, the cloud-based server 103 may determine a historical message transmission length (e.g. an average amount of time required to transmit a message 106, a bit length of a message 106, etc.) associated with one or more messages 106 transmitted to the target computing device 101' by the cloud-based server 103. The message transmission server application 105' may compare a historical message transmission length to a prospective message transmission length of a message 106 based on current context data 113 and, if the prospective transmission length of the message 106 corresponds to the historical message transmission length (e.g. is within a tolerance range of the historical message transmission length), transmit the message 106 to the target computing device 101'. Otherwise, the message 106 may be retained in the message storage queue 107 until the prospective transmission length of the message 106 complies with the historical message transmission length, if ever.

Figure 3:
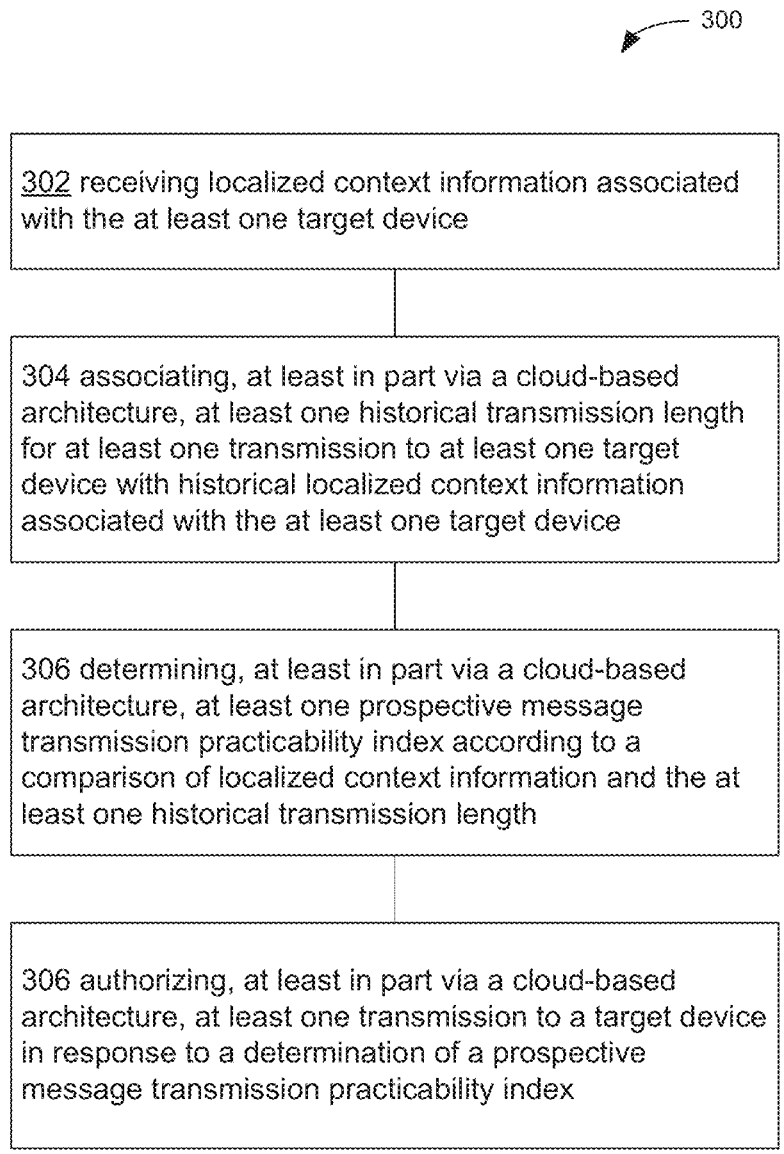

FIG. 3 and the following figures include various examples of operational flows, discussions and explanations may be provided with respect to the above-described exemplary environment of FIGS. 1-2. However, it should be understood that the operational flows may be executed in a number of other environments and contexts, and/or in modified versions of FIGS. 1-2. In addition, although the various operational flows are presented in the sequence(s) illustrated, it should be understood that the various operations may be performed in different sequential orders other than those which are illustrated, or may be performed concurrently.

Further, in the following figures that depict various flow processes, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently.

FIG. 3 illustrates an operational procedure 300 for practicing aspects of the present disclosure including operations 302, 304, 306 and 308.

Operation 302 illustrates receiving localized context information associated with the at least one target device. For example, a target computing device 101' may include one or more context sensors 112 configured to detect context information associated with the target computing device 101' and/or its environment and generate context data 113. It may be the case that such context data 113 may be indicative of an impact on the ability of the cloud-based server 103 to transmit messages 106 to the target computing device 101'. For example, context data 113 indicating that the target computing device 101' is in a remote location may correlate with difficulties in transmitting messages 106 to the target computing device 101'. As such, one or more context sensors 112 of the target computing device 101' may detect a context of the target computing device 101' and/or its environment and transmit data associated with the detecting to the message transmission server application 105' running on the cloud-based server 103 where the context information may be employed to control transmission of messages 106 to the target computing device 101'.

Operation 304 illustrates associating, at least in part via a cloud-based architecture, at least one historical transmission length for at least one transmission to at least one target device with historical localized context information associated with the at least one target device. For example, as shown in FIGS. 1-2, the message transmission server application 105' running on the cloud-based server 103 may detect an authorization (e.g. detecting the setting of a flag by the message transmission server application 105' indicative of an authorization, detecting the actual transmission of one or more messages 106 by the message transmission server application 105', etc.) of a transmission of a message 106 to a target computing device 101' and store a time-stamp from a system clock to the server data store 109. The message transmission server application 105' running on the cloud-based server 103 may then determine an amount of time elapsed between the authorization of the transmission of a message 106 to a target computing device 101' and a confirmation of transmission of the message 106 to the target computing device 101'. For example, upon receipt of a message 106, the target computing device 101' may generate a delivery confirmation 114 associated with the message 106. Upon receipt of the delivery confirmation 114, the message transmission server application 105' may compare a current system clock time to the time-stamp associated with the transmission of the message 106 stored in the server data store 109 to determine a elapsed length of time for the transmission of the message 106. The elapsed time may be stored as a historical transmission parameter 111 in the server data store 109. Further, as noted above, it may be the case that context data 113 sensed by target computing device 101' and/or the cloud-based server 103 may be indicative of the ability of the cloud-based server 103 to transmit messages 106 to the target computing device 101'. As such, context data 113 associated with a current state of a target computing device 101' may be a proxy for a prospective transmission length associated with a given message 106. As such, the message transmission server application 105' may map context data 113 detected at a given point in time to a transmission length determined for a message 106 transmitted at about that point in time and store mapping data 115 to the server data store 109 (e.g. as a look up table). Such associations of transmission lengths and corresponding context data 113 may occur for multiple message transmissions over a period of time to provide a historical data set of message transmission length/context data 113 mappings. In one exemplary embodiment, the transmission length of may be an average transmission length for multiple message transmissions having at least partially common context data 113. In another exemplary embodiment, the transmission length of may be a weighted average transmission length for multiple message transmissions having at least partially common context data 113 where messages having more proximate transmission time stamps are given greater weight than messages having more distant transmission timestamps.

Operation 306 illustrates determining, at least in part via a cloud-based architecture, at least one prospective message transmission practicability index according to a comparison of localized context information and the at least one historical transmission length. For example, as noted above, it may be the case that context data 113 associated with a current state of a target computing device 101' may be a proxy for a prospective transmission length associated with a given message 106, an accordingly, the practicality of such a transmission. As such, upon receipt of proximate context data 113 associated with a current state of a target computing device 101', that context data 113 may be mapped to one or more historical transmission lengths (e.g. via comparison to context data 113 previously mapped to previously detected transmission lengths associated with messages 106 to determine a prospective transmission length for a pending message 106 corresponding with the present context data 113. Upon determination of that prospective transmission length, the prospective transmission length may be correlated to one or more prospective transmission practicability indices 116. For example, a prospective transmission length within a first time range (e.g. less than five minutes) may be equated to a prospective message transmission practicability index value indicative of a high practicability of the successful transmission of the messages 106 to the target computing device 101'. A prospective transmission length within a second time range (e.g. between five and ten minutes) may be equated to a prospective message transmission practicability index value indicative of a moderate practicability of the successful transmission of the messages 106 to the target computing device 101'. A prospective transmission length within a third time range (e.g. greater than ten minutes) may be equated to a prospective message transmission practicability index value indicative of a low practicability of the successful transmission of the messages 106 to the target computing device 101'.

Operation 308 illustrates authorizing, at least in part via a cloud-based architecture, at least one transmission to a target device in response to a determination of a prospective message transmission practicability index. For example, as shown in FIGS. 1-2, upon the computation of prospective transmission practicability index 116 value associated with the received context data 113 as described with respect to operation 304, the message transmission server application 105' may compare that prospective transmission practicability index 116 associated with the received context data 113 to a threshold transmission practicability index 110 (e.g. a threshold quantification indicative of an allowable prospective transmission length) associated with (e.g. mapped to in a look-up table having entries for one or more computing devices 101) the target computing device 101' and maintained by the server data store 109 of the server data store 109

FIG. 4 illustrates an example embodiment where operation 302 of example operational flow 300 of FIG. 3 may include at least one additional operation. Additional operations may include an operation 402 and/or 404.

Operation 402 illustrates receiving localized context information associated with the at least one target device in response to an enqueuing of a transmission. For example, as shown in FIGS. 1-2, a user of the computing device 101 may employ the message creation server application 105 to create a message 106 for transmission to the target computing device 101'. When the message 106 is ready for transmission, the message 106 may be enqueued in the message storage queue 107. In response to the enqueuing of the message 106 for transmission to the target computing device 101', the message transmission server application 105' running on the cloud-based server 103 may query one or more context sensors 112 of a target computing device 101'. The context sensors 112 of a target computing device 101' may detect a context of the target computing device 101' and provide context data 113 associated with such detecting to the cloud-based server 103 where it may be received by the message transmission server application 105'.

Operation 404 illustrates receiving localized context information associated with the at least one target device in response to an enqueuing of a threshold number of transmissions. For example, as shown in FIGS. 1-2, a user of the computing device 101 may employ the message creation server application 105 to create a number of messages 106 for transmission to the target computing device 101'. When a message 106 is ready for transmission, the message 106 may be enqueued in the message storage queue 107. Over time, the message storage queue 107 may accumulate a number of messages 106 for transmission to the target computing device 101'. In response to the enqueuing of a threshold number of messages 106 for transmission to the target computing device 101' (e.g. a threshold number stored in server data store 109, a threshold number set according to a user setting, etc.), the message transmission server application 105' running on the cloud-based server 103 may query one or more context sensors 112 of a target computing device 101'. The context sensors 112 of a target computing device 101' may detect a context of the target computing device 101' and provide context data 113 associated with such detecting to the cloud-based server 103 where it may be received by the message transmission server application 105'.

FIG. 5 illustrates an example embodiment where operation 302 of example operational flow 300 of FIG. 3 may include at least one additional operation. Additional operations may include an operation 502, 504 and/or 506.

Operation 502 illustrates receiving at least one geographical identifier associated with the at least one target device. For example, as shown in FIGS. 1-2, target computing device 101' may include a global positioning system sensor 117. Upon enqueuing of a message 106 intended for a given target computing device 101', the message transmission server application 105' may query the global positioning system sensor 117 of the target computing device 101' for a geographic identifier of the target computing device 101'. The global positioning system sensor 117 of the target computing device 101' may detect a location of the target computing device 101' and provide context data 113 including the geographic identifier to the cloud-based server 103 where it may be received by the message transmission server application 105'.

Operation 504 illustrates receiving at least one power indicator associated with the at least one target device. For example, as shown in FIGS. 1-2, a target computing device 101' may include a power level sensor 118. Upon enqueuing of a message 106 intended for a given target computing device 101', the message transmission server application 105' may query the power level sensor 118 of the target computing device 101' for its current power level. The power level sensor 118 may detect a power level (e.g. a battery life, a current usage, etc.) of the target computing device 101' and provide context data 113 including the power level to the cloud-based server 103 where it may be received by the message transmission server application 105'.

Operation 506 illustrates receiving one or more inertial signals associated with the at least one target device. For example, as shown in FIGS. 1-2, a target computing device 101' may include an inertial sensor 119 configured to detect motion of the target computing device 101' indicative of use of the target computing device 101'. Upon enqueuing of a message 106 intended for a given target computing device 101', the message transmission server application 105' may query the inertial sensor 119 of the target computing device 101' for an indication of usage of the target computing device 101'. The inertial sensor 119 may detect a degree of movement (e.g. movement indicative of use of the target computing device 101' by a user) of the target computing device 101' and provide context data 113 including inertial signals to the cloud-based server 103 where it may be received by the message transmission server application 105'.

Figure 6:
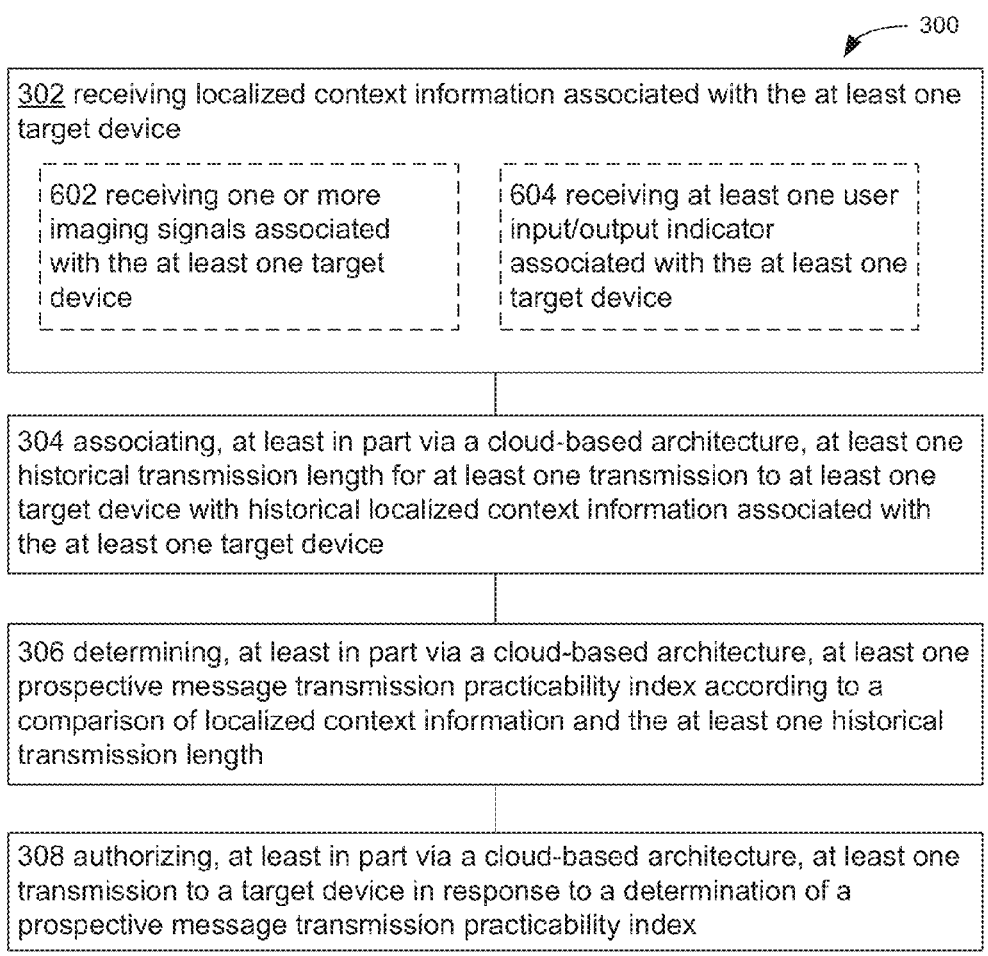

FIG. 6 illustrates an example embodiment where operation 302 of example operational flow 300 of FIG. 3 may include at least one additional operation. Additional operations may include an operation 602 and/or 604.

Operation 602 illustrates receiving one or more imaging signals associated with the at least one target device. For example, as shown in FIGS. 1-2, a target computing device 101' may include a image capture sensor 120. Upon enqueuing of a message 106 intended for a given target computing device 101', the message transmission server application 105' may query the image capture sensor 120 of the target computing device 101' to obtain an image of the current environment of the target computing device 101'. The image capture sensor 120 may capture an image of the environment of the target computing device 101' and provide context data 113 including imaging signals to the cloud-based server 103 where it may be received by the message transmission server application 105'. The image of the environment may be analyzed (e.g. by image recognition software running on the cloud-based server 103) to determine the current environment.

Operation 604 illustrates receiving at least one user input/output indicator associated with the at least one target device. For example, as shown in FIGS. 1-2, a target computing device 101' may include a user input/output device 121 (e.g. a touchscreen, a keypad, a display, a microphone, a speaker, etc.) configured to receive/provide user input/output of the target computing device 101'. Such user input/output may be indicative of use of the target computing device 101'. Upon enqueuing of a message 106 intended for a given target computing device 101', the message transmission server application 105' may query the target computing device 101' for an indication of a number of user inputs/outputs having occurred via the user input/output device 121 of the target computing device 101'. The user input/output device 121 may detect a number of user inputs/outputs having occurred via the user input/output device 121 of the target computing device 101' and provide context data 113 including user input/output data to the cloud-based server 103 where it may be received by the message transmission server application 105'.

Figure 7:
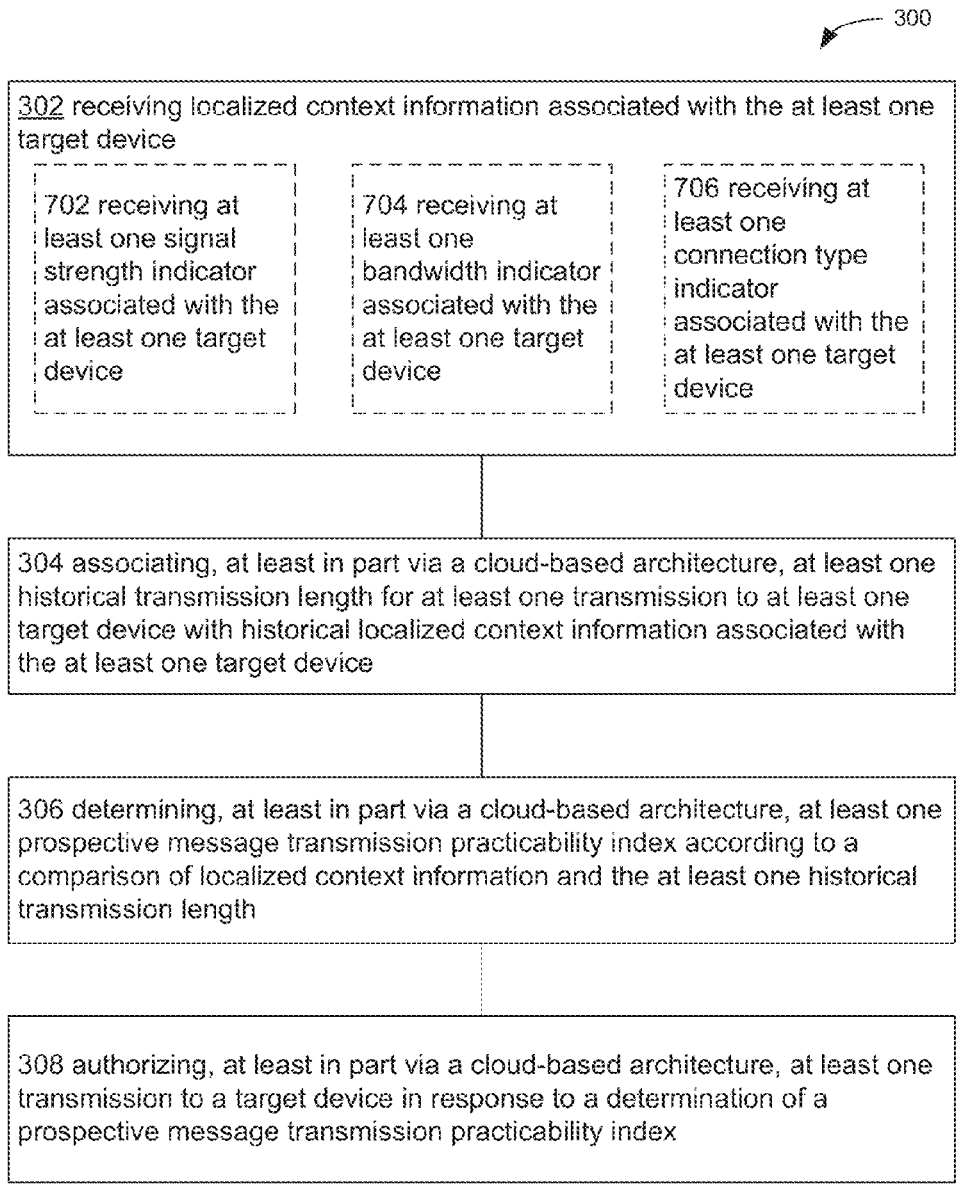

FIG. 7 illustrates an example embodiment where operation 302 of example operational flow 300 of FIG. 6 may include at least one additional operation. Additional operations may include an operation 702, 704 and/or 708.

Operation 702 illustrates receiving at least one signal strength indicator associated with the at least one target device. For example, as shown in FIGS. 1-2, upon enqueuing of a message 106 intended for a given target computing device 101', the message transmission server application 105' may query the network 102 and/or the target computing device 101' for the signal strength between the target computing device 101' and the network 102. The network 102 and/or the target computing device 101' may detect a signal strength (e.g. a power value, a gain value, etc.) and provide context data 113 including signal strength data to the cloud-based server 103 where it may be received by the message transmission server application 105'.

Operation 704 illustrates receiving at least one bandwidth indicator associated with the at least one target device. For example, as shown in FIGS. 1-2, upon enqueuing of a message 106 intended for a given target computing device 101', the message transmission server application 105' may query the network 102 and/or the target computing device 101' for the bandwidth (e.g. data throughput, a bandwidth availability, etc.) between the target computing device 101' and the network 102. The network 102 and/or the target computing device 101' may detect a bandwidth and provide context data 113 including bandwidth data to the cloud-based server 103 where it may be received by the message transmission server application 105'.

Operation 706 illustrates receiving at least one connection type indicator associated with the at least one target device. For example, as shown in FIGS. 1-2, upon enqueuing of a message 106 intended for a given target computing device 101', the message transmission server application 105' may query the network 102 and/or the target computing device 101' for the network connection type (e.g. Wi-fi, Bluetooth, cellular, hard wired, etc.) between the target computing device 101' and the network 102. The network 102 and/or the target computing device 101' may detect a connection type and provide context data 113 including the connection type to the cloud-based server 103 where it may be received by the message transmission server application 105'

FIG. 8 illustrates an example embodiment where operation 304 of example operational flow 300 of FIG. 3 may include at least one additional operation. Additional operations may include an operation 802, 804 and/or 806.

Operation 802 illustrates associating, at least in part via a cloud architecture, the at least one historical transmission length with at least one historical geographical identifier associated with the at least one target device. For example, as shown in FIGS. 1-2, the message transmission server application 105' running on the cloud-based server 103 may map geographical context data 113 associated with a location of the target computing device 101' detected at a given point in time to a transmission length determined for a message 106 transmitted to the target computing device 101' at about that point in time and store mapping data 115 to the server data store 109 (e.g. as a look up table).

Operation 804 illustrates associating, at least in part via a cloud architecture, the at least one historical transmission length with at least one historical power indicator associated with the at least one target device. For example, as shown in FIGS. 1-2, the message transmission server application 105' running on the cloud-based server 103 may map power status parameters context data 113 associated with performance characteristics, system status, remaining battery life, and the like of the target computing device 101' detected at a given point in time to a transmission length determined for a message 106 transmitted to the target computing device 101' at about that point in time and store mapping data 115 to the server data store 109 (e.g. as a look up table).

Operation 806 illustrates associating, at least in part via a cloud architecture, the at least one historical transmission length with at least one historical inertial signal associated with the at least one target device. For example, as shown in FIGS. 1-2, the message transmission server application 105' running on the cloud-based server 103 may map context data 113 associated with device movement/usage target computing device 101' detected at a given point in time to a transmission length determined for a message 106 transmitted to the target computing device 101' at about that point in time and store mapping data 115 to the server data store 109 (e.g. as a look up table).

Figure 9:
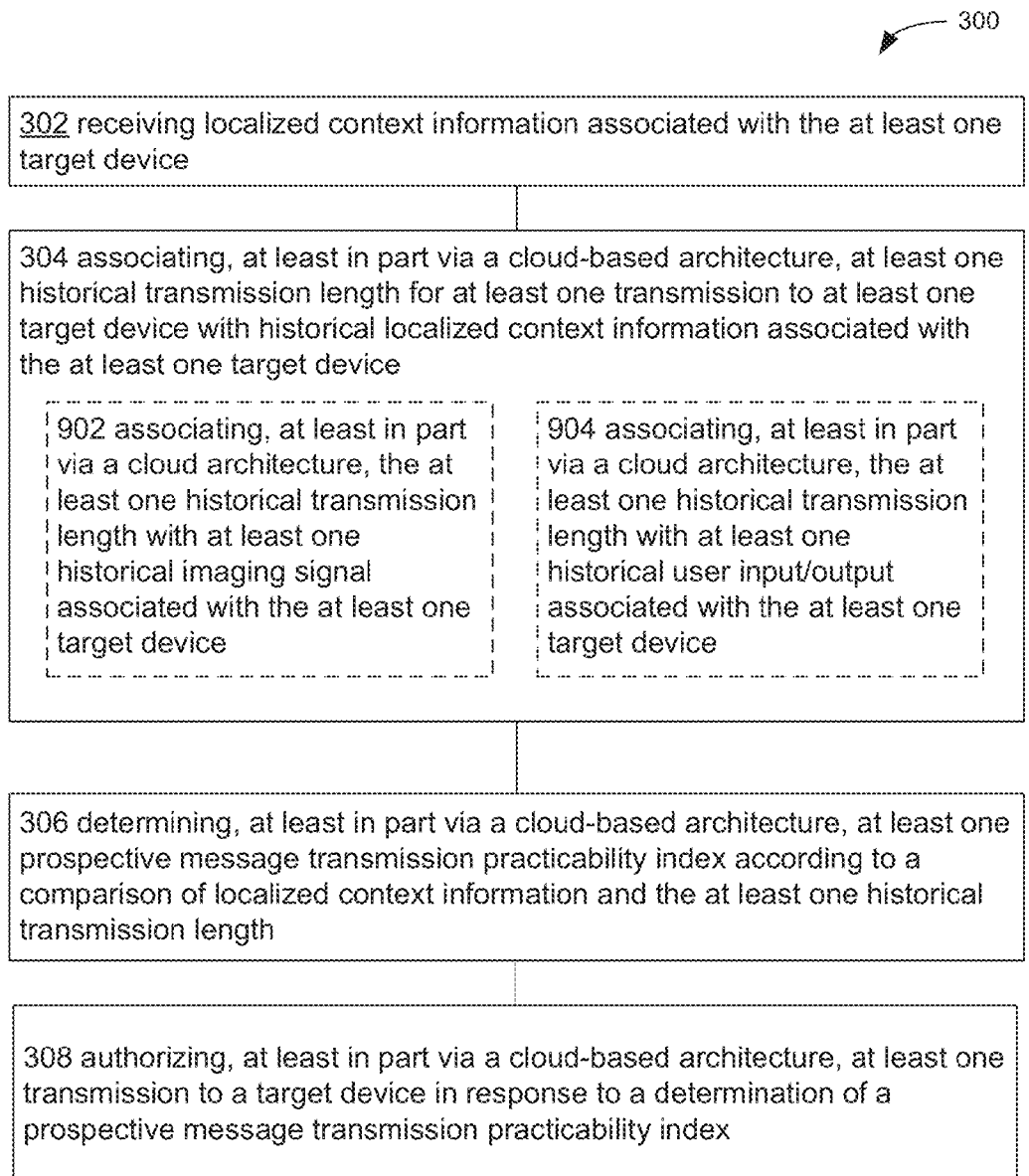

FIG. 9 illustrates an example embodiment where operation 304 of example operational flow 300 of FIG. 3 may include at least one additional operation. Additional operations may include an operation 902 and/or 904.

Operation 902 illustrates associating, at least in part via a cloud architecture, the at least one historical transmission length with at least one historical imaging signal associated with the at least one target device. For example, as shown in FIGS. 1-2, the message transmission server application 105' running on the cloud-based server 103 may map image signal context data 113 associated with an environment of the target computing device 101' detected at a given point in time to a transmission length determined for a message 106 transmitted to the target computing device 101' at about that point in time and store mapping data 115 to the server data store 109 (e.g. as a look up table).

Operation 904 illustrates associating, at least in part via a cloud architecture, the at least one historical transmission length with at least one historical user input/output associated with the at least one target device. For example, as shown in FIGS. 1-2, the message transmission server application 105' running on the cloud-based server 103 may map user input/output context data 113 associated with an usage of the target computing device 101' detected at a given point in time to a transmission length determined for a message 106 transmitted to the target computing device 101' at about that point in time and store mapping data 115 to the server data store 109 (e.g. as a look up table).

FIG. 10 illustrates an example embodiment where operation 304 of example operational flow 300 of FIG. 3 may include at least one additional operation. Additional operations may include an operation 1002, 1004 and/or 1008.

Operation 1002 illustrates associating, at least in part via a cloud architecture, the at least one historical transmission length with at least one historical signal strength associated with the at least one target device. For example, as shown in FIGS. 1-2, the message transmission server application 105' running on the cloud-based server 103 may map signal strength context data 113 associated with a signal strength of a connection between the network 102 and the target computing device 101', between the cloud-based server 103 and the network 102, and the like, detected at a given point in time to a transmission length determined for a message 106 transmitted to the target computing device 101' at about that point in time and store mapping data 115 to the server data store 109 (e.g. as a look up table).

Operation 1004 illustrates associating, at least in part via a cloud architecture, the at least one historical transmission length with at least one historical bandwidth associated with the at least one target device. For example, as shown in FIGS. 1-2, the message transmission server application 105' running on the cloud-based server 103 may map bandwidth context data 113 associated with a bandwidth of a connection between the network 102 and the target computing device 101', between the cloud-based server 103 and the network 102, and the like, detected at a given point in time to a transmission length determined for a message 106 transmitted to the target computing device 101' at about that point in time and store mapping data 115 to the server data store 109 (e.g. as a look up table).

Operation 1006 illustrates associating, at least in part via a cloud architecture, the at least one historical transmission length with at least one historical connection type associated with the at least one target device. For example, as shown in FIGS. 1-2, the message transmission server application 105' running on the cloud-based server 103 may map connection type context data 113 associated with a connection between the network 102 and the target computing device 101', between the cloud-based server 103 and the network 102, and the like, detected at a given point in time to a transmission length determined for a message 106 transmitted to the target computing device 101' at about that point in time and store mapping data 115 to the server data store 109 (e.g. as a look up table).

Figure 11:
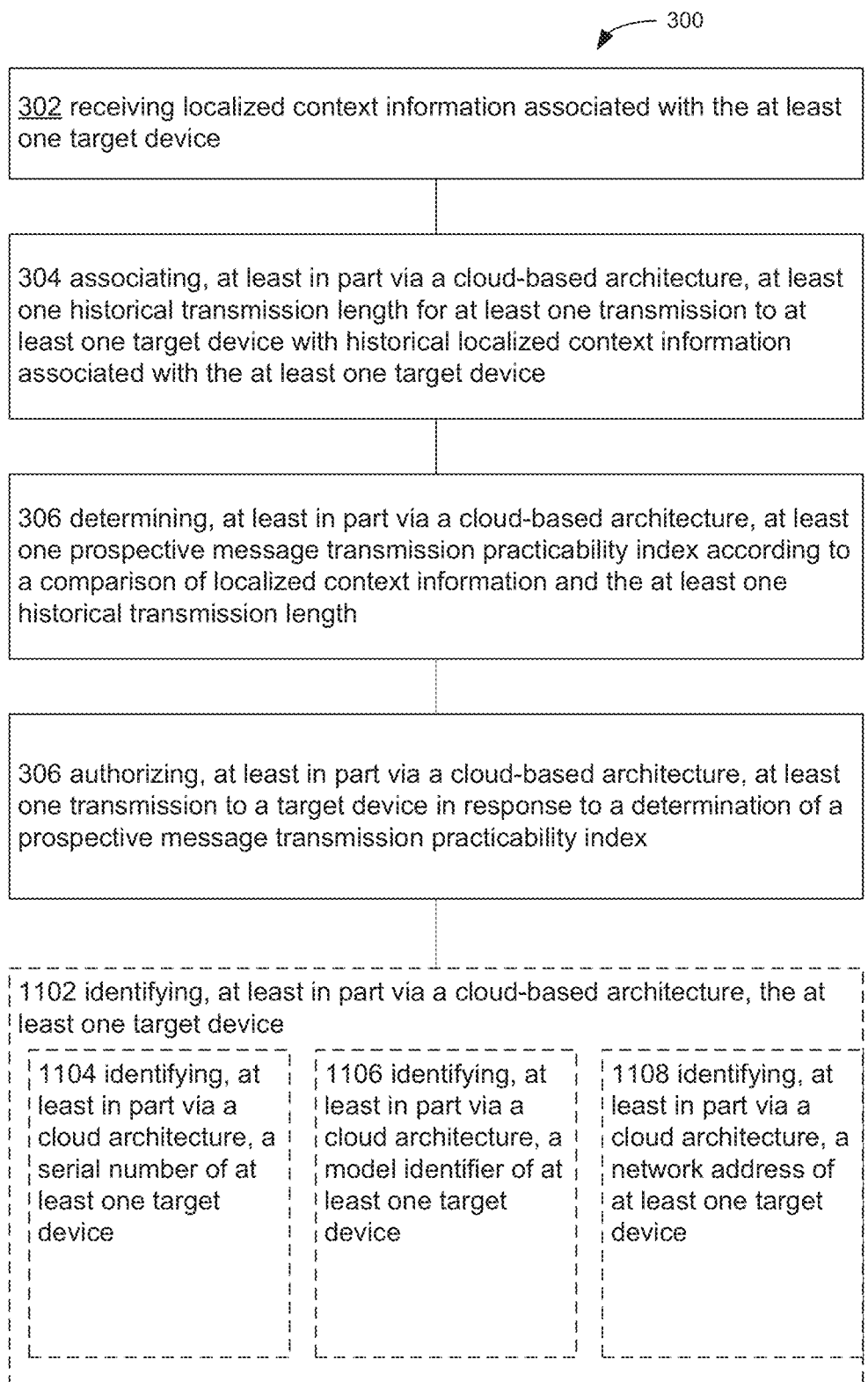

FIG. 11 illustrates an example embodiment where example operational flow 300 of FIG. 3 may include at least one additional operation. Additional operations may include an operation 1102, 1104, 1106 and/or 1108.

Operation 1102 illustrates identifying, at least in part via a cloud-based architecture, the at least one target device. For example, as shown in FIGS. 1-2, it may be the case that the message transmission server application 105' may discriminate between multiple target computing devices 101' and maintain distinct threshold transmission practicability index 110 for each target computing device 101' or groups of target computing devices 101' based on their respective device performance characteristics, bandwidth usage, usage histories, etc. In one embodiment, the server data store 109 may maintain a device ID database 122. The device ID database 122 may include one or more device identifiers (e.g. serial numbers, model identifier, network addresses, etc.) assigned to target computing devices 101'. One or more device identifiers assigned to respective target computing devices 101' may be mapped to at least one threshold transmission practicability index 110 in the server data store 109. Upon enqueuing of a message 106 intended for a given target computing device 101', the message transmission server application 105' may query the target computing device 101' for its device identifier, and obtain the appropriate threshold transmission practicability index 110 for that target computing device 101' according to the mapping between the device identifier for that target computing device 101' in the device ID database 122 and the threshold transmission practicability index 110.

Operation 1104 illustrates identifying, at least in part via a cloud architecture, a serial number of at least one target device. For example, as shown in FIGS. 1-2, it may be the case that the message transmission server application 105' may discriminate between multiple target computing devices 101' and maintain a distinct threshold transmission practicability index 110 for each target computing device 101' or groups of target computing devices 101' based on their respective device performance characteristics, bandwidth usage, usage histories, etc. (e.g. transmissions of messages 106 and context data 113 for a target computing device 101' having a first serial number category may be aggregated with other similar devices). In one embodiment, the device ID database 122 may include one or more serial numbers assigned to target computing devices 101'. One or more serial numbers assigned to respective target computing devices 101' may be mapped to at least one threshold transmission practicability index 110 in the server data store 109. Upon enqueuing of a message 106 intended for a given target computing device 101', the message transmission server application 105' may query the target computing device 101' for its serial number, and obtain the appropriate threshold transmission practicability index 110 for that target computing device 101' according to the mapping between the serial number for that target computing device 101' in the device ID database 122 and the threshold transmission practicability index 110.

Operation 1106 illustrates identifying, at least in part via a cloud architecture, a model identifier of at least one target device. For example, as shown in FIGS. 1-2, the message transmission server application 105' may discriminate between multiple target computing devices 101' and maintain a distinct threshold transmission practicability index 110 for groups of target computing devices 101' based on their respective device performance characteristics, bandwidth usage (e.g. transmissions of messages 106 and context data 113 for target computing device 101' models having a multi-core processor may aggregated with other similar devices). For example, the device ID database 122 may include one or more model identifiers (e.g. a model identifier associate with a vendor of target computing devices 101' such as Apple®, Sony®, Samsung®, Google®, HTC®, Microsoft®, and/or device-specific model identifiers) associated with the target computing devices 101'. One or more model identifiers assigned to respective target computing devices 101' may be mapped to at least one threshold transmission practicability index 110 in the server data store 109. Upon enqueuing of a message 106 intended for a given target computing device 101', the message transmission server application 105' may query the target computing device 101' for its model identifier, and obtain the appropriate threshold transmission practicability index 110 for that target computing device 101' according to the mapping between the model identifier for that target computing device 101' in the device ID database 122 and the threshold transmission practicability index 110.

Operation 1108 illustrates identifying, at least in part via a cloud architecture, a network address of at least one target device. For example, as shown in FIGS. 1-2, the message transmission server application 105' may discriminate between multiple target computing devices 101' and maintain a distinct threshold transmission practicability index 110 for each target computing device 101' or groups of target computing devices 101' based on the network connectivity for various branches of network 102 (e.g. transmissions of messages 106 and context data 113 for target computing devices 101' wirelessly connected to a portion of the network 102 may be distinct from transmission of messages 106 and context data 113 for target computing devices 101' on a wired portion of the network 102). For example, the device ID database 122 may include one or more network addresses (e.g. IP addresses for a LAN, WAN, the Internet, etc.) associated with the target computing devices 101' connected to network 102. One or more network addresses assigned to respective target computing devices 101' may be mapped to at least one threshold transmission practicability index 110 in the server data store 109. Upon enqueuing of a message 106 intended for a given target computing device 101', the message transmission server application 105' may query the target computing device 101' for its network address or extract the destination network address from the message 106 itself, and obtain the appropriate threshold transmission practicability index 110 for that target computing device 101' according to the mapping between the network address for that target computing device 101' in the device ID database 122 and the threshold transmission practicability index 110.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject

What is claimed is:

1. A method comprising
receiving localized context information associated with at least one target device;
associating, at least in part via a cloud-based architecture, at least one historical transmission time length for at least one transmission to at least one target device with historical localized context information associated with the at least one target device;
comparing, at least in part via a the cloud-based architecture, proximate localized context information associated with the at least one target device to the historical localized context information associated with the at least one target device;
determining, at least in part via a the cloud-based architecture, at least one prospective transmission time length according to the comparing, at least in part via a the cloud-based architecture, proximate localized context information associated with the at least one target device to the historical localized context information associated with the at least one target device;
determining, at least in part via the cloud-based architecture, at least one prospective message transmission practicability index according to the prospective transmission time length; and
authorizing, at least in part via a cloud-based architecture, at least one transmission to the at least one target device responsive to a determination of the at least one prospective message transmission practicability index,
wherein the cloud-based architecture includes:
at least one cloud-based server in communication with at least one message generating computing device and at least one target device via a communications network.

2. The method of claim 1, wherein the at least one transmission includes at least one message for transmission according to at least one of: an e-mail message protocol; a text message protocol; and an instant message protocol.

3. The method of claim 1, wherein the at least one historical transmission time length includes:
at least one average historical transmission time length for two or more transmissions to the at least one target device.

4. The method of claim 3, wherein the at least one average historical transmission time length for two or more transmissions to the at least one target device comprises:
at least one weighted average historical transmission time length for two or more transmissions to the at least one target device.

5. The method of claim 1, wherein the receiving localized context information associated with at least one target device includes:
receiving localized context information associated with at least one target device in response to an enqueuing of a transmission.

6. The method of claim 5, wherein the receiving localized context information associated with at least one target device includes:
receiving localized context information associated with at least one target device in response to an enqueuing of a threshold number of transmissions.

7. The method of claim 1, wherein the receiving localized context information associated with the at least one target device includes:
receiving at least one geographical identifier associated with the at least one target device.

8. The method of claim 1, wherein the receiving localized context information associated with at least one target device includes:
receiving at least one power indicator associated with the at least one target device.

9. The method of claim 1, wherein the receiving localized context information associated with at least one target device includes:
receiving one or more inertial signals associated with the at least one target device.

10. The method of claim 1, wherein the receiving localized context information associated with at least one target device includes:
receiving one or more imaging signals associated with the at least one target device.

11. The method of claim 1, wherein the receiving localized context information associated with at least one target device includes:
receiving at least one user input/output indicator associated with the at least one target device.

12. The method of claim 1, wherein the receiving localized context information associated with at least one target device includes:
receiving one or more audio signals associated with the at least one target device.

13. The method of claim 1, wherein the receiving localized context information associated with at least one target device includes:
receiving at least one signal strength indicator associated with the at least one target device.

14. The method of claim 1, wherein the receiving localized context information associated with at least one target device includes:
receiving at least one bandwidth indicator associated with the at least one target device.

15. The method of claim 1, wherein the receiving localized context information associated with at least one target device includes:
receiving at least one connection type indicator associated with the at least one target device.

16. The method of claim 1, wherein the associating, at least in part via a cloud-based architecture, at least one historical transmission time length for at least one transmission to at least one target device with historical localized context information associated with the at least one target device includes:
associating, at least in part via a cloud architecture, the at least one historical transmission time length with at least one historical geographical identifier associated with the at least one target device.

17. The method of claim 1, wherein the associating, at least in part via a cloud-based architecture, at least one historical transmission time length for at least one transmission to at least one target device with historical localized context information associated with the at least one target device includes:
associating, at least in part via a cloud architecture, the at least one historical transmission time length with at least one historical power indicator associated with the at least one target device.

18. The method of claim 1, wherein the associating, at least in part via a cloud-based architecture, at least one historical transmission time length for at least one transmission to at least one target device with historical localized context information associated with the at least one target device includes:
associating, at least in part via a cloud architecture, the at least one historical transmission time length with at least one historical inertial signal associated with the at least one target device.

19. The method of claim 1, wherein the associating, at least in part via a cloud-based architecture, at least one historical transmission time length for at least one transmission to at least one target device with historical localized context information associated with the at least one target device includes:
  associating, at least in part via a cloud architecture, the at least one historical transmission time length with at least one historical imaging signal associated with the at least one target device.

20. The method of claim 1, wherein the associating, at least in part via a cloud-based architecture, at least one historical transmission time length for at least one transmission to at least one target device with historical localized context information associated with the at least one target device includes:
  associating, at least in part via a cloud architecture, the at least one historical transmission time length with at least one historical user input/output associated with the at least one target device.

21. The method of claim 1, wherein the associating, at least in part via a cloud-based architecture, at least one historical transmission time length for at least one transmission to at least one target device with historical localized context information associated with the at least one target device includes:
  associating, at least in part via a cloud architecture, the at least one historical transmission time length with at least one historical audio signal associated with the at least one target device.

22. The method of claim 1, wherein the associating, at least in part via a cloud-based architecture, at least one historical transmission time length for at least one transmission to at least one target device with historical localized context information associated with the at least one target device includes:
  associating, at least in part via a cloud architecture, the at least one historical transmission time length with at least one historical signal strength associated with the at least one target device.

23. The method of claim 1, wherein the associating, at least in part via a cloud-based architecture, at least one historical transmission time length for at least one transmission to at least one target device with historical localized context information associated with the at least one target device includes:
  associating, at least in part via a cloud architecture, the at least one historical transmission time length with at least one historical bandwidth associated with the at least one target device.

24. The method of claim 1, wherein the associating, at least in part via a cloud-based architecture, at least one historical transmission time length for at least one transmission to at least one target device with historical localized context information associated with the at least one target device includes:
  associating, at least in part via a cloud architecture, the at least one historical transmission time length with at least one historical connection type associated with the at least one target device.

25. The method of claim 1, further comprising:
  identifying, at least in part via a cloud-based architecture, the at least one target device.

26. The method of claim 25, wherein the identifying, at least in part via a cloud-based architecture, the at least one target device includes:
  identifying, at least in part via a cloud architecture, a serial number of at least one target device.

27. The method of claim 1, wherein the identifying, at least in part via a cloud-based architecture, the at least one target device includes:
  identifying, at least in part via a cloud architecture, a model identifier of at least one target device.

28. The method of claim 1, wherein the identifying, at least in part via a cloud-based architecture, the at least one target device includes:
  identifying, at least in part via a cloud architecture, a network address of at least one target device.

29. A system comprising:
  a cloud-based server device configured for:
    receiving localized context information associated with at least one target device;
    associating, at least in part via a cloud-based architecture, at least one historical transmission time length for at least one transmission to at least one target device with historical localized context information associated with the at least one target device
    determining, at least in part via the cloud-based architecture, at least one prospective message transmission practicability index according to the prospective transmission time length; and
    authorizing, at least in part via a cloud-based architecture, at least one transmission to the at least one target device responsive to a determination of the at least one prospective message transmission practicability index.

30. A system comprising:
  at least one computing device programmed for:
    receiving localized context information associated with at least one target device;
    associating, at least in part via a cloud-based architecture, at least one historical transmission time length for at least one transmission to at least one target device with historical localized context information associated with the at least one target device;
    determining, at least in part via the cloud-based architecture, at least one prospective message transmission practicability index according to the prospective transmission time length; and
    authorizing, at least in part via a cloud-based architecture, at least one transmission to the at least one target device responsive to a determination of the at least one prospective message transmission practicability index.

31. A system comprising:
  electronic circuitry for receiving localized context information associated with at least one target device;
  electronic circuitry for associating, at least in part via a cloud-based architecture, at least one historical transmission time length for at least one transmission to at least one target device with historical localized context information associated with the at least one target device;
  electronic circuitry for determining, at least in part via the cloud-based architecture, at least one prospective message transmission practicability index according to the prospective transmission time length; and
  electronic circuitry for authorizing, at least in part via a cloud-based architecture, at least one transmission to the at least one target device responsive to a determination of the at least one prospective message transmission practicability index.

32. A non-transitory computer-readable medium including computer-readable instructions for execution of a method on a computing device, the method comprising:
  receiving localized context information associated with at least one target device;
  associating, at least in part via a cloud-based architecture, at least one historical transmission time length for at least one transmission to at least one target device with historical localized context information associated with the at least one target device;

determining, at least in part via the cloud-based architecture, at least one prospective message transmission practicability index according to the prospective transmission time length; and authorizing, at least in part via a cloud-based architecture, at least one transmission to the at least one target device responsive to a determination of the at least one prospective message transmission practicability index.

33. The method of claim 1, wherein the cloud-based architecture includes:

at least one cloud-based server including at least one message generating computing device in communication with at least one target device via a communications network.

34. The method of claim 1, wherein the cloud-based architecture includes:

at least one cloud-based server including at least one message generating computing device operably couplable to the at least one target device via two or more network connection types.

35. The method of claim 1, wherein the authorizing, at least in part via a cloud-based architecture, at least one transmission to the at least one target device responsive to a determination of the at least one prospective message transmission practicability index includes:

selecting a connection type responsive to the proximate localized context information associated with the at least one target device; and authorizing, at least in part via a cloud-based architecture, at least one transmission via the selected connection type to the at least one target device responsive to a determination of the at least one prospective message transmission practicability index.

36. The method of claim 1, wherein the comparing, at least in part via the cloud-based architecture, proximate localized context information associated with the at least one target device to the historical localized context information associated with the at least one target device includes:

comparing, at least in part via the cloud-based architecture, a bit length of a message associated with the at least one target device to historical message bit length information associated with the at least one target device.

37. The method of claim 1, wherein the comparing, at least in part via the cloud-based architecture, proximate localized context information associated with the at least one target device to the historical localized context information associated with the at least one target device includes:

comparing, at least in part via the cloud-based architecture, message attribute associated with the at least one target device to at least one historical message attribute associated with at least one message previously transmitted to at least one target device.

38. The method of claim 1, wherein the authorizing, at least in part via a cloud-based architecture, at least one transmission to the at least one target device responsive to a determination of the at least one prospective message transmission practicability index includes:

authorizing, at least in part via a cloud-based architecture, at least one transmission of data stored on the message generating computing device to the at least one target device responsive to a determination of the at least one prospective message transmission practicability index.

39. The method of claim 1, wherein the determining, at least in part via the cloud-based architecture, at least one prospective message transmission practicability index according to the prospective transmission time length includes:

determining, at least in part via the cloud-based architecture, at least one prospective message transmission practicability index indicative of a practicability of transmission via a connection type according to the prospective transmission time length.

* * * * *